United States Patent [19]
Tojo et al.

[11] Patent Number: 5,511,959
[45] Date of Patent: Apr. 30, 1996

[54] SCROLL TYPE FLUID MACHINE WITH PARTS OF SINTERED CERAMICS

[75] Inventors: Kenji Tojo, Ibaraki; Masahisa Sofue, Mito, both of Japan

[73] Assignee: Hitachi, Ltd., Tokyo, Japan

[21] Appl. No.: 240,359

[22] Filed: May 10, 1994

Related U.S. Application Data

[63] Continuation-in-part of Ser. No. 925,123, Aug. 6, 1992, abandoned.

[30] Foreign Application Priority Data

Aug. 6, 1991 [JP] Japan .................... 3-196619

[51] Int. Cl.⁶ .............. F01C 1/04; C04B 35/56; C04B 35/58
[52] U.S. Cl. ........... 418/55.1; 418/55.2; 418/55.3; 418/55.5; 418/56; 418/57; 384/907.1; 464/903; 501/92; 501/97
[58] Field of Search .............. 418/55.1, 55.2, 418/55.3, 55.5, 56, 57, 152; 501/92, 97, 98; 464/102, 903; 384/297, 907.1

[56] References Cited

U.S. PATENT DOCUMENTS

| | | | |
|---|---|---|---|
| 4,609,334 | 9/1986 | Muir et al. | 418/55.5 |
| 4,767,293 | 8/1988 | Caillat et al. | 418/55.5 |
| 5,102,316 | 4/1992 | Caillat et al. | 418/55.5 |
| 5,122,485 | 6/1992 | Akimune | 501/97 |
| 5,130,279 | 7/1992 | Koyama et al. | 501/97 |
| 5,132,257 | 7/1992 | Kodama et al. | 501/97 |
| 5,200,373 | 4/1993 | Yasutomi et al. | 501/98 |

FOREIGN PATENT DOCUMENTS

| | | | |
|---|---|---|---|
| 57-73886 | 5/1982 | Japan | 418/56 |
| 58-214689 | 12/1983 | Japan . | |
| 58-214690 | 12/1983 | Japan . | |
| 58-214688 | 12/1983 | Japan . | |
| 61-266589 | 10/1986 | Japan | 418/55.2 |
| 61-226584 | 10/1986 | Japan | 418/55.2 |
| 63-106421 | 5/1988 | Japan | 384/907.1 |
| 2-196185 | 8/1990 | Japan . | |
| 2-196182 | 8/1990 | Japan . | |
| 2-196184 | 8/1990 | Japan . | |
| 2-233892 | 9/1990 | Japan | 418/55.3 |
| 2-248675 | 10/1990 | Japan . | |
| 2-248676 | 10/1990 | Japan . | |
| 2-248677 | 10/1990 | Japan . | |
| 2-298686 | 12/1990 | Japan . | |
| 2-298685 | 12/1990 | Japan . | |
| 3-3988 | 1/1991 | Japan | 418/55.1 |

*Primary Examiner*—John J. Vrablik
*Attorney, Agent, or Firm*—Antonelli, Terry, Stout & Kraus

[57] ABSTRACT

A scroll fluid machine including a fixed scroll an orbiting scroll an Oldham ring and bearing portions which are entirely or partly made of a reaction-bonded precise sintered ceramics which is superior in near-net-shape property, and particularly made of a reaction bonded precise sintered ceramics which is produced by reaction-bonding inorganic compound particles such as $Al_2O_3$, SiC, TiN, ZrN etc. with $Si_3N_4$ which is a nitride of Si.

13 Claims, 9 Drawing Sheets

(a) NORMAL PRESSURE SINTERED CERAMICS (b) $Si_3N_4$ BONDED CERAMICS

SCROLL TYPE FLUID MACHINE WITH PARTS OF SINTERED CERAMICS

This is a continuation-in-part of application Ser. No. 925,123 filed Aug. 6, 1992, now abandoned.

FIELD OF THE INVENTION

The present invention relates to a scroll type fluid machine for use as a scroll compressor, scroll expander or the like.

BACKGROUND OF THE INVENTION

As shown in FIG. 1, a conventional scrool compressor includes a fixed scroll 1, an orbiting scroll 2 and a frame 3, with the fixed scroll 1 being mounted on the frame 3 and including an end plate 1a, which has an inlet port 6 at its outer periphery and an outlet port 7 at its center, and an upstanding spiral wrap 1b on the end plate 1a. The orbiting scroll 2 includes an end plate 2a with an spiral having spiral wrap 2b, the same shape as that of the spiral wrap of the fixed scroll 1. An Oldham ring 5 and an eccentric portion of a main shaft 4 are arranged to engage with a rear surface of said orbiting scroll 2. The spiral wrap 1b of the fixed scroll 1 and the spiral wrap 2b of the orbiting scroll 2 are arranged to be combined with each other, with their phases being shifted from each other. The main shaft 4 is rotatably supported by bearings 14b and 14c in the frame 3, and the eccentric portion 4a of the main shaft 4 engages with a boss 2c formed on the rear surface of the end plate 2a of the orbiting scroll 2, thereby driving the orbiting scroll 2. The Oldham ring is arranged to make reciprocal movement on the frame 3, on the one hand, and to make reciprocal movement relatively to the orbiting scroll member 2, on the other hand, thereby preventing the orbiting scroll 2 from rotating around its own axis. When the main shaft 4 is rotated, the orbiting scroll 2 causes an orbital movement, without causing rotation around its own axis, so that a gas suctioned into the compressor through the inlet port 6 is fed into a compression chamber 8. The compression chamber 8 gradually decreases its volume as the gas gradually moves to the central portion under the action of the orbital movement of the orbiting scroll 2. The gas confined in the compression chamber 8 gradually increases its pressure, until the gas is discharged from the outlet port 7 of the end plate 1a of the fixed scroll 1.

In the scroll type fluid machine of the above type, it is always required to maintain a sealing property between the wraps of the both scrolls and to make the finished shape and dimension of each scroll wrap at high precision. For this purpose, it has been a usual practice to form the scroll from metallic material such as Fe, Al or the like and to apply machining process by a NC milling machine or the like. Such precision machining process requires relatively long time to make the scroll. There are further problems in the conventional scroll type fluid machine. That is, relatively little consideration has been heretofore given to a thermal environment surrounding the scroll type fluid machine and an influence of the thermal environment on the scroll type fluid machine, so that the problems such as superheating of the gas fed into the compressor or thermal deformation of the parts caused thereby remain unsolved. Particularly, in the case of the scroll compressor of high pressure case type, that is the scroll compressor in which the compressing element of the compressor is contained in a high pressure atmosphere (a discharged gas which is compressed to a high pressure) the gas suctioned into the compressor is heated to a higher temperature due to heat conducted through the fixed scroll 1, the frame 3 or the like, resulting in parts of the compressor becoming deformed due to uneven thermal distribution and pressure caused thereby. Thus, the satisfactory sealing property is lost and leakage of gas is increased, that adversely affect the performance of the compressor.

Furthermore, in the conventional scroll compressor it has been the usual practice to use the scrolls 1 and 2 made of metallic material. Accordingly, the sliding surfaces of these scrolls tend to produce wearing or sticking together to stop rotation during operation, so that the conventional scroll compressor lacks reliability. Particularly, when the scroll compressor is made in oil-free type, reduction of thermal expansion and thermal conduction and reduction of wearing on the sliding surfaces constitute severe and important problems in the scroll compressor.

Accordingly, in order to maintaining a high performance level for the scroll type fluid machine, it is necessary to maintain a proper gap between the constituting parts of the scroll type fluid machine for a long time in order to secure its good sealing property and to secure durability of sliding surfaces of the constituting parts.

Japanese Patent Application Laid-Open Sho 58-214689 proposes a construction of a scroll type fluid machine of a non-metallic material or ceramics, such as alumina ($Al_2O_3$)-system oxides, silicon carbide (SiC)-system carbides, silicon nitride ($Si_3N_4$)-system or boron nitride (BN)-system nitrides which have been subjected to heat treatment at high temperatures. This construction enables a suppression of the deformation of the parts caused by heat produced by compression, to control and maintain a proper gap between the parts, to decrease thermal conduction and to improve reliability of the sliding parts.

The construction proposed in the above-mentioned Japanese application still has some problems to be solved. That is, no consideration is given to formability of ceramics, maintaining of precision of product of ceramics and lubricant oil holding property at relatively sliding parts and, consequently, problems concerning the number of machining steps and the reliability of the product remain unsolved. In other words, in case of the conventional ceramics as described above, an art for producing ceramics having uniform characteristic has not yet been established and, therefore, the ceramics produced by the conventional process lacks reliability. Furthermore, in the case of the conventional ceramics, relatively large dimensional change, such as of 15–20 %, is caused before and after a sintering process effected at a high temperature, and a product having a high dimensional precision cannot be formed, without applying a number of processing steps, such as grinding and finishing steps after effecting the high temperature processing. Accordingly, the manufacturing cost is very high. Furthermore, the ceramics, after being subjected to the high temperature processing has a structure in which the ceramic particles are diffused with respect to each other so as to fill up pores between the ceramic particles to form a dense structure and then sintered under such condition. Accordingly, the structure of the conventional ceramics is inferior in its pore distribution, its density and lubricant oil holding capability and, consequently, its lubricating property. Under such circumstances, the ceramics as described above has been not yet brought into practical use.

SUMMARY OF THE INVENTION

In view of the conventional art of the ceramics heretofore proposed, it is an object of the present invention to provide a scroll type fluid machine in which the disadvantages of the conventional ceramics are avoided.

It is a particular object of the present invention to provide a scroll type fluid machine which serves to suppress an effect of a thermal environment surrounding the scroll type fluid machine, which can maintain a high sealing property and a durability, which is light in weight and has a high efficiency, which is superior in machinability, and which is reliable in operation.

In order to attain the object as described above, the present invention provides a scroll type fluid machine including a pair of scrolls each having an end plate and a spiral wrap, in which one or both of the wraps are entirely or partly, at portions of the wraps or the portions of the end plates confronting the wraps, bearing portions of a driving shaft for driving the orbiting scroll, a revolving bearing where the orbiting scroll engages with a eccentric portion of the driving shaft or an Oldham ring, formed of a precise sintered ceramics which is superior in near-net-shape property (which means such property that the ceramics can be formed by sintering to dimensions near its final finished shape, without requiring machining process) and in sliding characteristics. For example, the precise sintered ceramics is formed as a reaction bonded precise sintered ceramics which is made by the reaction bonding method in which filler particles of inorganic compound, such as $Al_2O_3$, SiC, TiN, ZrN etc. are bonded together by $Si_3N_4$ which is a nitride of Si. When the parts of the scrolls are made by forming and sintering the reaction bonded precise sintered ceramics, the dimensional precision of the sintered product can be reproducibly controlled. The reaction bonded precise sintered ceramics can be formed as a porous sintered product which has open pores at the porosity of 2–30%, and, preferably, 10–30%, so that the pores can be impregnated with liquid or solid lubricant material, whereby the parts which are superior in wear resistant property, antisticking property and low in friction coefficient can be obtained. When the fixed scroll made of such ceramics is fixedly mounted on the metallic frame, an elastically deformable supporting member may be arranged between the fixed scroll and the frame, in order to reduce a strain caused by a difference in thermal expansion between the ceramics and the metal.

According to the construction of the scroll type fluid machine of the present invention, the parts having sliding surface, such as the scroll and the like which are made of the above-mentioned ceramics, can be manufactured, with considerably reduced after-processing steps, such as grinding step or finishing step, and, therefore, a scroll-type fluid machine having a superior machinability, a suppressed thermal influence, a high volumetric efficiency, a reduced power loss and a high performance can be obtained.

BRIEF DESCRIPTION OF THE DRAWINGS

FIG. 8b is a plan view of the fixing part shown in FIG. 8a

FIG. 9b is a plan view of the fixing part shown in FIG. 9a

FIG. 10b is a plane view showing the fixing part shown in FIG. 10a.

DETAILED DESCRIPTION

Figure 1:
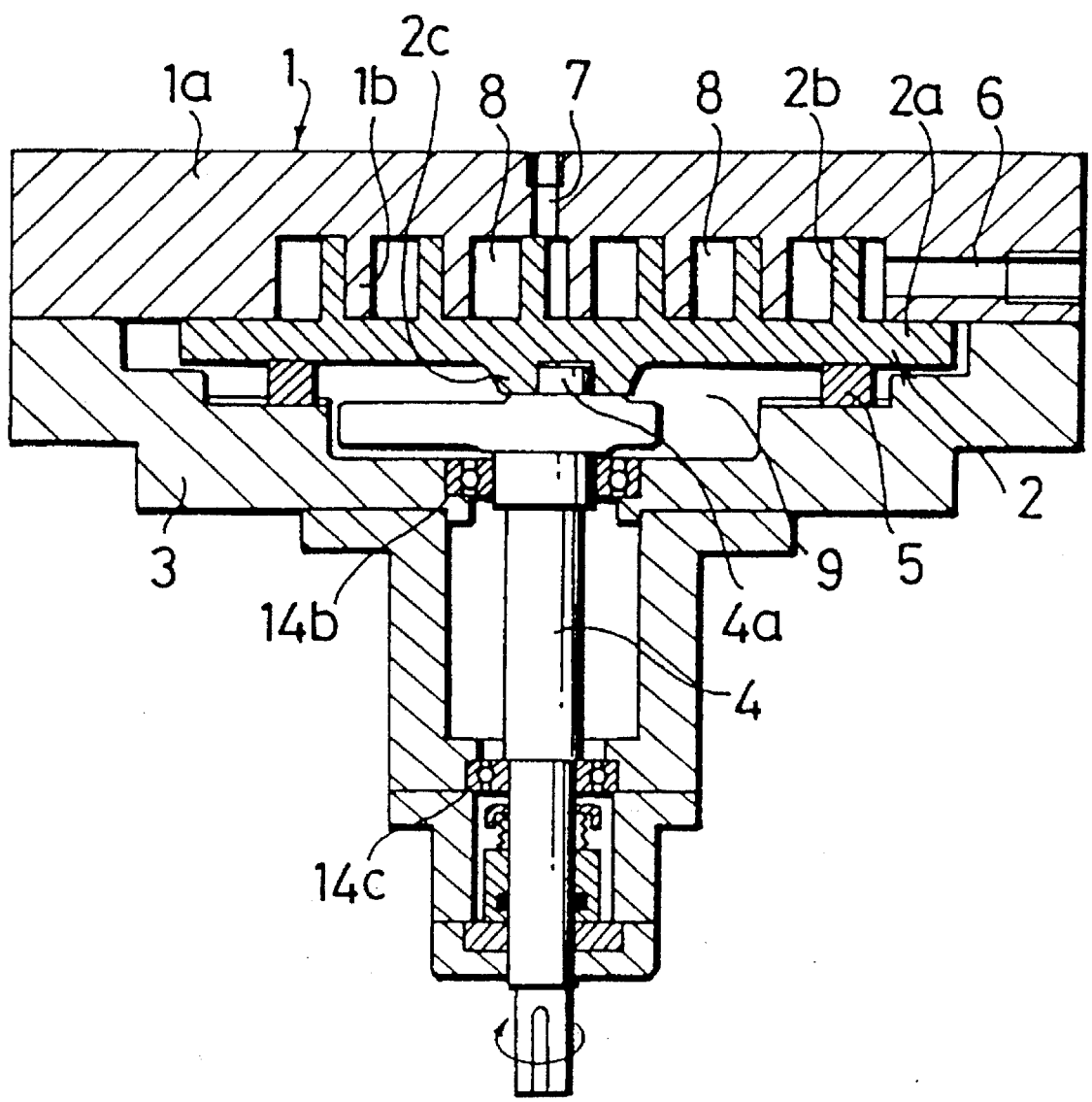
FIG. 1 is a sectional view of a portion of a conventional scroll compressor.
Figure 2:
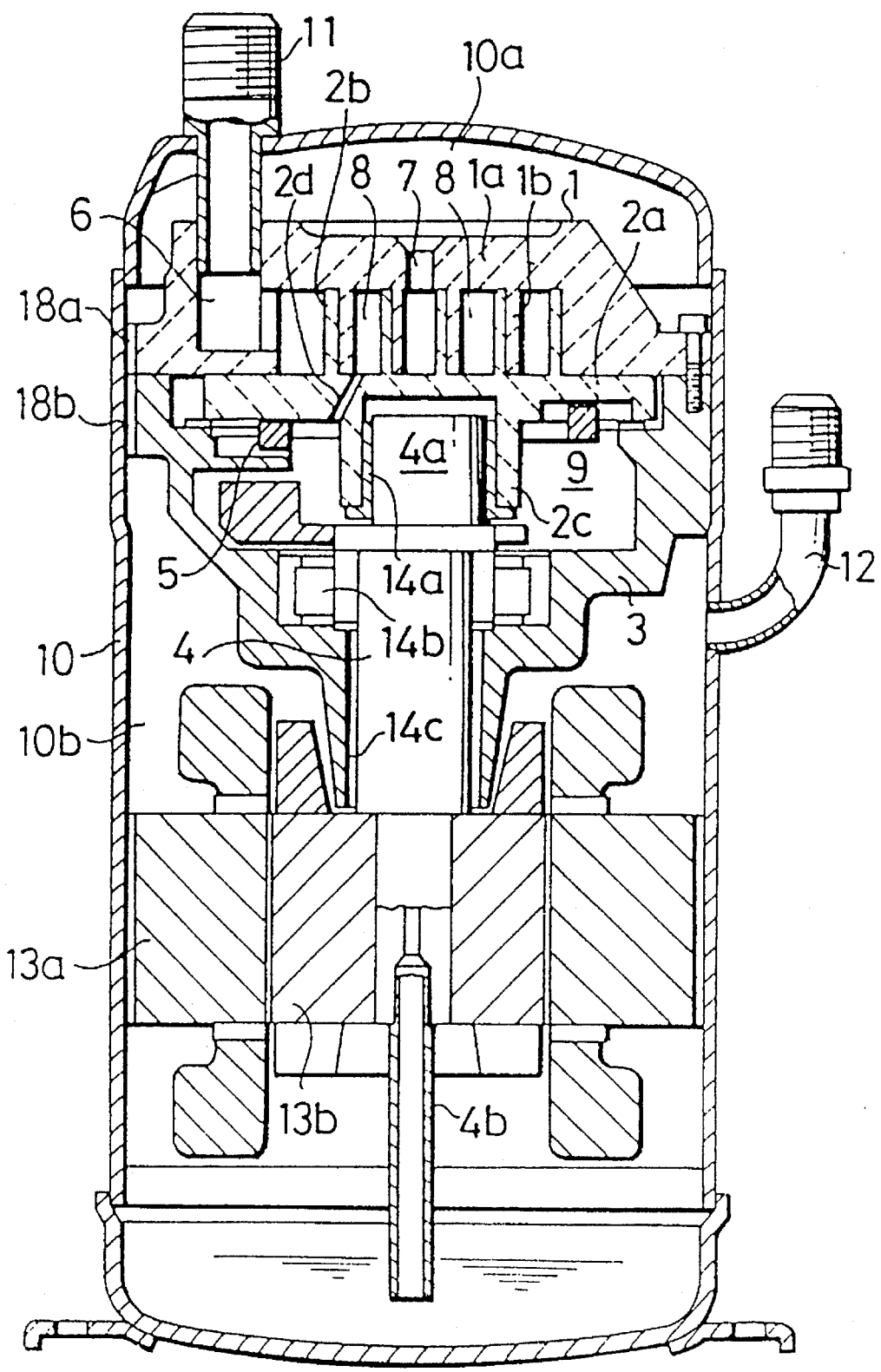
FIG. 2 is a sectional view showing a scroll compressor according to an embodiment of the present invention.

The scroll type fluid machine, for example a scroll compressor constructed in accordance with the present invention, as shown in FIG. 2 includes a hermetic case 10, which contains a compressing mechanism portion and an electric motor portion therein. The compressing mechanism portion includes a fixed scroll 1 and an orbiting scroll 2, which have wraps, respectively, which are held in engaged relation to form a compression chamber (sealed space) 8 therebetween. The fixed scroll 1 has a disc-shaped end plate 1a and an upstanding spiral wrap 16. An inlet port 6 is formed at the peripheral portion of the end plate and a discharge port 7 is formed at the central portion thereof. The orbiting scroll 2 has a disc-shaped end plate 2a, and an upstanding spiral wrap 2b and has a substantially same shape as that of the wrap 1b and a boss portion 2c. A frame 3 has bearing portions 14b and 14c at its central portion. A main shaft 4 is rotatably mounted by the bearing portions 14b and 14c and has an eccentric shaft 4a at its forward end, which engages with said boss portion 2c. The fixed scroll 1 is fixed to the frame 3 by a plurality of bolts or the like. An Oldham mechanism, including an Oldham ring 5 and an Oldham key, is interposed between the orbiting scroll 2 and the frame 3, so that the orbiting scroll 2 produces an orbital movement relatively to the fixed scroll, without making a rotational movement around its own axis. A rotor 13b of the electric motor part is arranged at the end of the main shaft 4 opposite to the eccentric shaft 4a.

An inlet pipe 11 is connected through the hermetic case 10 to the inlet port 6 of the fixed scroll 1. The discharge port 7 opens into a discharge chamber 10a, which communicates through passages 18a and 18b with a motor chamber 10b located at the underside thereof and the motor chamber 10b communicates with a discharge pipe 12 formed on the hermetic case 10.

A space 9 is confined by the rear surface of the orbiting scroll 1 and the frame 3 and this space forms a back pressure chamber. An intermediate pressure between the inlet pressure and the discharge pressure is applied to the space 9, so as to resist the axial force (which acts to separate the orbiting scroll 2 away from the fixed scroll 1) caused by the gas pressure in a plurality of compression chambers 8 formed between the orbiting scroll 2 and the fixed scroll 1. The intermediate pressure is produced by conducting the gas contained in the compression chamber 8 into the back pressure chamber 9 through a fine passage 2d formed in the end plate 2a of the orbiting scroll 2, which serves to communicate the compression chamber 8, in which the gas is being compressed, with the back pressure chamber 9. This intermediate pressure acts on the rear surface of the orbiting scroll 2.

A lubricant feeding bore is formed in the main shaft 4 and the eccentric shaft 4a from an oil feeding tube 4b projecting from the lower end of the main shaft to the upper end of the eccentric shaft 4a (not shown), so that a lubricant oil contained in the bottom of the hermetic case is fed to each of the bearing portions 14a, 14b and 14c. The lubricant oil fed to the bearing portion serves to lubricate the bearing portion and is then discharged into the back pressure chamber 9. The lubricant oil discharged into the back pressure chamber 9 acts to lubricate the Oldham mechanism parts, the peripheral portions of the both scrolls and the like. The lubricant oil is then fed to the compressing chamber 8 to lubricate and seal the inside of the compressing chamber and discharged together with a refrigerant gas through the outlet port 7 into the discharge chamber 10a. The lubricant oil discharged into the discharge chamber 10a is fed, together with the refrigerant gas, through the passages 18a and 18b to the motor chamber 10b and then separated from the refrigerant gas and reserved in a reservoir formed in the bottom of the hermetic case 10.

In the scroll compressor as described above, when the main shaft 4, directly connected to the motor 13, is rotated, the orbiting scroll 2 is driven by the eccentric shaft 4a, whereby the orbital movement of the orbiting scroll is produced. By the orbital movement of the orbiting scroll, the compression chamber 8 is successively moved to the central portion, while successively reducing its volume. Accordingly, the gas suctioned from the inlet port 6 and confined in the compression chamber 8 successively increases its pressure and it is discharged through the central discharge port 7 into the discharge chamber 10a. The discharged gas at high temperature and high pressure flows through the passages 18a and 18b into the motor chamber 10b and then it is discharged to the outside through the ejecting pipe 12.

In the embodiment of FIG. 2, one or both of the fixed scroll 1 and the orbiting scroll 2 are made of a precise sintered ceramics which is superior in near-net-shape property and has a small dimensional change before and after sintering. As such ceramics, use is made of a reaction bond ceramics which is produced by bonding filler inorganic compound particles, such as $Al_2O_3$, SiC, TiN, Zr or the like particles, together by $Si_3N_4$ which is a nitride of Si.

Figure 3:
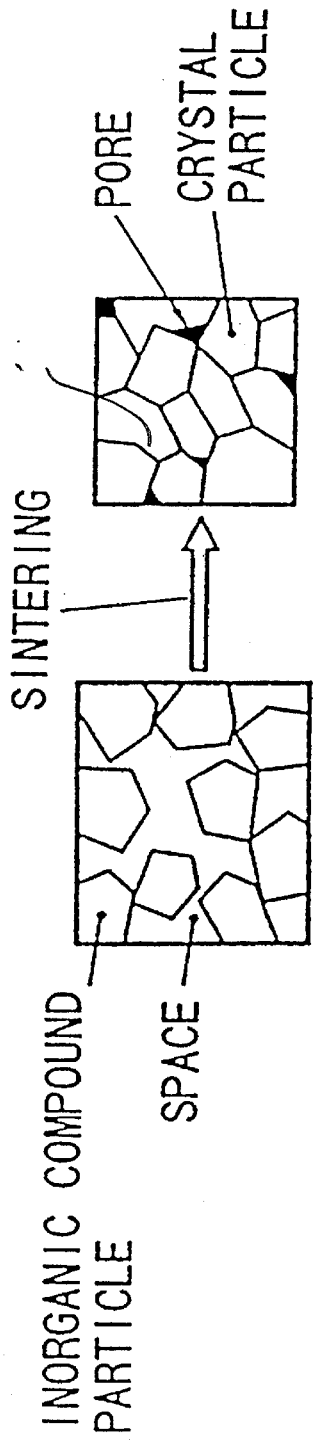
FIGS. 3a and 3b illustrates a structure of the ceramics used in the present invention and a structure of the conventional ceramics.
Figure 3:
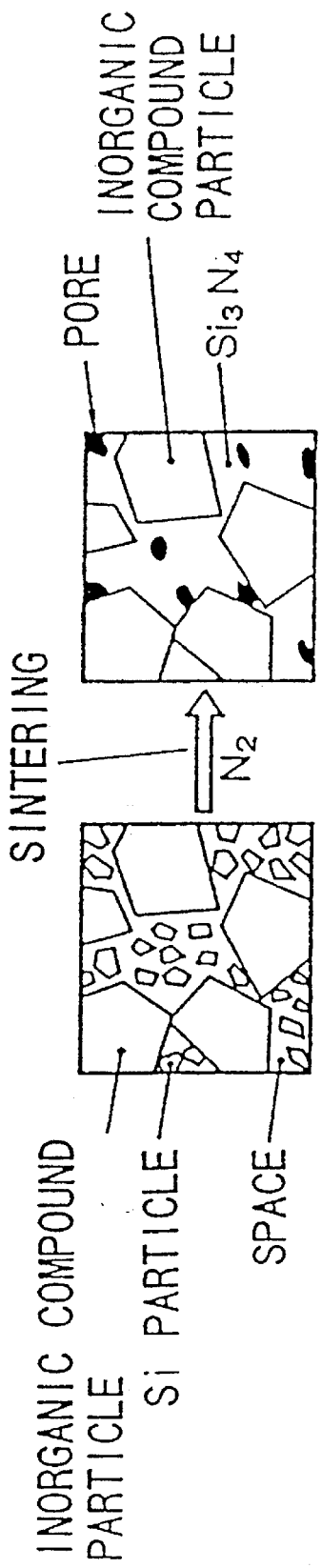

In case of a normal pressure sintered ceramics, such as $Al_2O_3$, $Si_3N_4$, SiC or the like, a considerable linear shrinkage on the order of 15–20% is produced at the time of normal sintering, so that a volume is reduced to about half of the original volume. As shown in FIG. 3a, the normal sintering process proceeds, while the ceramic particles become integrated together to form a dense body. The normal sintering and shrinking proceeding is affected by almost all of the factors of the ceramics manufacturing process. Accordingly, in order to control dimensional precision of the normal product after sintering which is produced by the normal pressure sintering process, it is necessary to severely control purities of raw material particles, particle sizes, uniformity of density of a product, temperature distribution at the time of sintering and the like. However, there is a limit to such control and, consequently, it has been practically impossible to control the dimensional precision of the normal sintered product below 10% to 15.

On the other hand, in case of the reaction-bonded precise ceramics which is produced by heating and normal sintering a high-pressure shaped article consisting of filler inorganic compound particles and intervening Si fine particles in a nitrogen atmosphere, a mixture of ceramics particles and Si particles is heated in a nitrogen atmosphere, whereby Si is nitrided to form $Si_3N_4$ by normal sintering, as shown in FIG. 3b. At this time, $Si_3N_4$ acts to bond the ceramic particles together, while producing its volume expansion of 23% at the time of nitriding reaction, so that the expanded $Si_3N_4$ fills up spaces in the pressed particle body thereby increasing the density of the pressed particle body. In the nitriding reaction of Si, a reaction product $Si_3N_4$ is formed by gas phase reaction. The reaction product $Si_3N_4$ is produced from the surfaces of the ceramic particles which has been used as raw materials, and this reaction product serves to bond the ceramic particles together. In view of the fact that the reaction is a gas phase reaction and that each of the ceramic particles constitutes a three-dimensional filler, the strength of the formed product is considerably increased and the dimensional change at the time of normal sintering is suppressed below 0.2%. Accordingly, the product, as sintered, has such characteristic features that the number of treatments, such as grinding and finishing treatments, can be considerably reduced and both scrolls can be formed with high precision.

In the embodiment of the invention as described above, the end plates 1a and 1b of both scrolls 1 and 2 which form the compression chamber 8, and the spiral wraps 1b and 2b are formed of the above-described reaction-bonded precise ceramics, so that the coefficient of thermal expansion of the parts is very low, for example in the order of ⅓ of that of the usual metal such as iron and the parts are prevented from causing deformation by compression heat. Thus, it is possible to properly control a gap between the scrolls.

The ceramics as described above have a low thermal conductivity, so that it can hardly conduct a heat to its insides. Therefore, the amount of heat conducted to the gas suctioned into the compressing mechanism part is minimized, so that the increase of specific volume is reduced. Consequently, the volume of gas suctioned into the compressing mechanism per unit time is increased and thus high volumetric efficiency is obtained.

The ceramics as mentioned above includes open pores in micron order (2–30% porosity preferably 10–30%) which serve to pass nitrogen gas at the time of sintering. The open pores can be impregnated with solid or liquid lubricant to improve the characteristics of friction of the sliding parts. In the illustrated embodiment, the lubricant oil which has lubricated the bearing portions and has been discharged into the back pressure chamber 9, is fed to the sliding parts at the peripheral potion of the orbiting scroll and the wrap portions within the compression chamber, whereby the sliding surface becomes impregnated with the lubricant oil. Thus, the oil holding property is considerably increased, resulting in lowering the coefficient of friction, decreasing the power loss and thus the compressor of high performance can be realized. The anti-sticking property of the sliding surface is considerably increased and a compressor having high reliability can be obtained.

Figure 4:
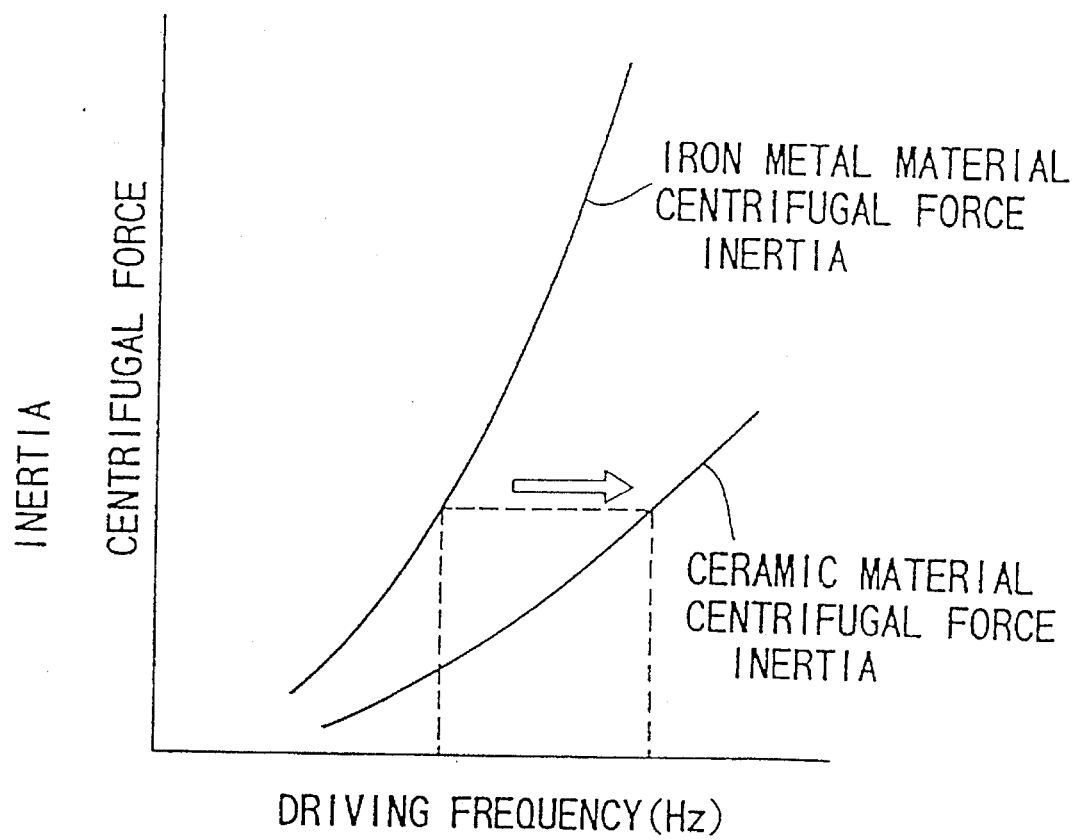
FIG. 4 illustrates a difference of load depending upon a different kind of material.

The above ceramics have a low density, in the order of ⅓of iron material (that is, it is of light weight). Accordingly, when the orbiting scroll 2 is made of the above-described ceramics, the centrifugal force applied to the orbiting scroll 2 owing to its orbital movement can be decreased. Accordingly, the load applied to the bearing portion 14a is reduced, with the result that it becomes possible to increase power frequency for driving the motor as compared to that of the conventional compressor in which the orbiting scroll is made of iron material. The centrifugal force generated on the orbiting scroll is in proportional relation to the density of the orbiting scroll and, consequently, it is possible to increase a frequency to the maximum frequency where the load created in the scroll corresponds to that of the conventional scroll compressor, as shown in FIG. 4.

Figure 5:
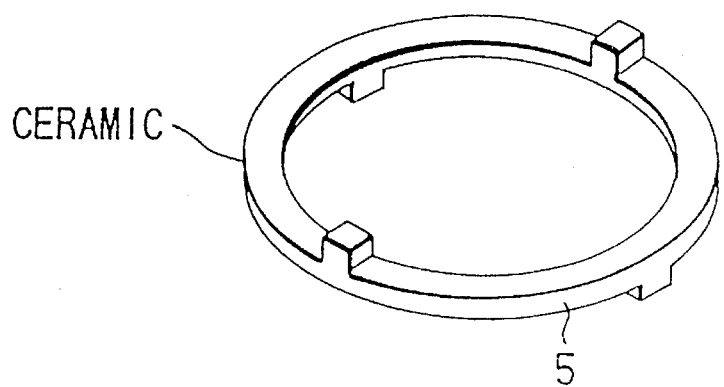
FIG. 5 is a perspective view showing an Oldham ring used in the embodiment of the present invention.

In the embodiment as shown in FIG. 5, the Oldham ring 5, which forms a member for preventing rotation of the scroll around its own axis, is made of the ceramics as described above. As described above in connection with the orbiting scroll 2, the weight of the Oldham ring is reduced as shown in FIG. 4, so that the inertia caused by the reciprocating motion of the Oldham ring is reduced and the load applied the key and groove therefore is reduced, and thus it becomes possible to raise the maximum driving frequency. Furthermore, the anti-sticking property and the wear-resistant property are improved, which largely contributes to increase reliability and efficiency of the compressor. By shaping an article of the above-described ceramics by using a metallic mold, removing a wax remaining on the surface of the shaped article and then applying heat treatment to form a sintered article, very high dimensional precision of the article can be maintained and the finishing processing can be eliminated so that considerable reduction of number of processing steps can be attained.

Figure 6:
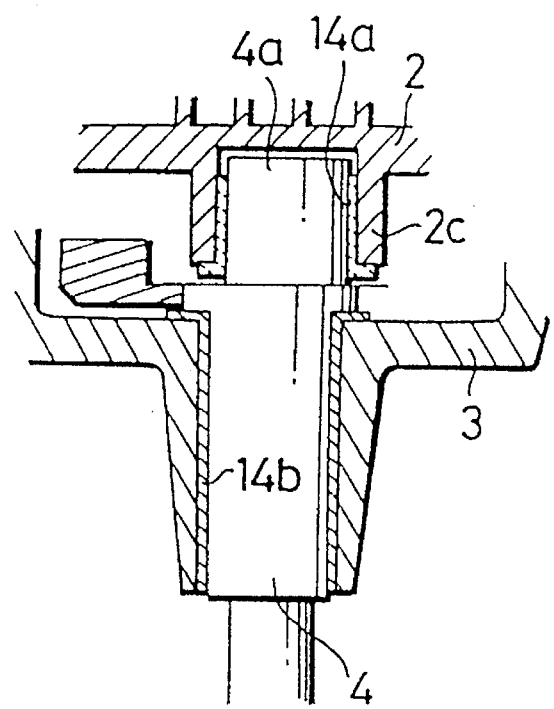
FIG. 6 is a sectional view showing a bearing part in the embodiment of the present invention.

FIG. 6 illustrates an embodiment in which said ceramics is used for the bearing 14a of the boss portion 2c of the orbiting scroll and for the bearing 14b of the frame portion. In any case, the annular bearing made of the above described ceramics is fixed to the metallic body directly by shrinkage fitting or through an insert material (not shown) consisting of Ti-system or Al-system material.

In this case, it is possible to precisely control the dimensional precision of the bearing made of sintered body, so that it is possible to considerably reduce the number of processing steps. The ceramics has fine open pores so that it can be impregnated with lubricant oil, which reduces the coefficient of friction and lowers the power loss, thus resulting in realizing a compressor having a high performance. Furthermore, the sticking or scuffing phenomenon can be avoided, at the time when the bearing portion needs oiling or lacks lubricant oil. The heat generation of the bearing portion itself due to the power loss is reduced and sticking-resistant property is improved, so that the compressor can be operated with higher load than that of the conventional compressor and the compressor having high reliability can be realized.

Figure 7:
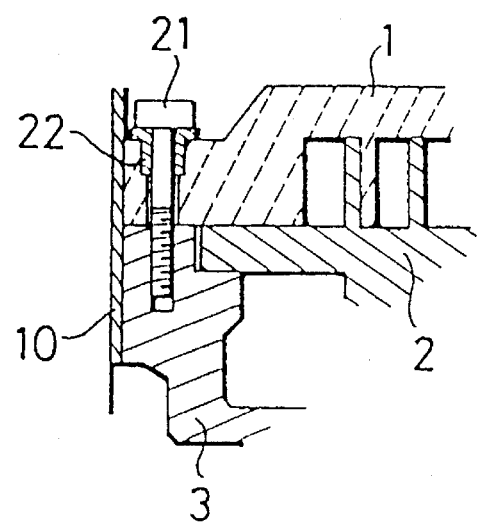
FIG. 7 is a sectional view showing a fixing part of a fixed scroll in one embodiment of the present invention.

FIG. 7 illustrates an embodiment of connection of the frame 3 with the fixed scroll 1 made of the above described ceramics. The fixed scroll 1 is fixed through an insert member 22 (for example, made of Cu-system, Al-system or the other metallic material) to the frame 3 by means of a plurality of bolts 21. If the scroll compressor is operated in a wide operating temperature range, a small dimensional difference may arise between the fixed scroll made of the ceramics and the frame member 3 made of metallic material such as Fe, due to a difference of their coefficients of thermal expansion. Such dimensional difference is absorbed by the insert member 22 which allows small axial and radial movements between the members so that stress which may arise between both members can be relieved.

Figure 8A:
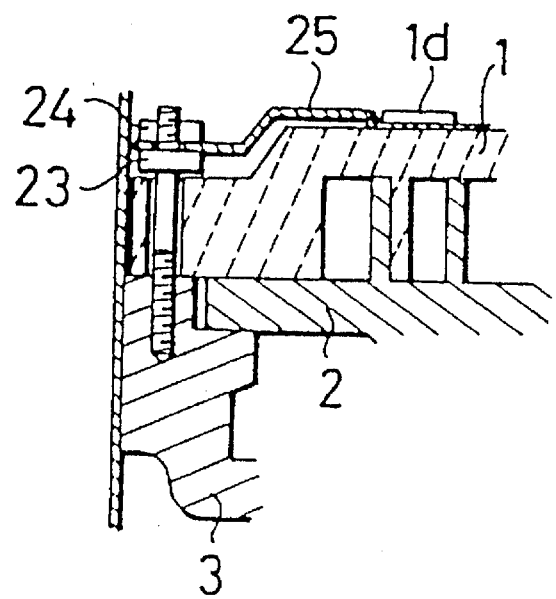
FIG. 8a is a sectional view showing a fixing part of a fixed scroll in another embodiment of the present invention.
Figure 8B:
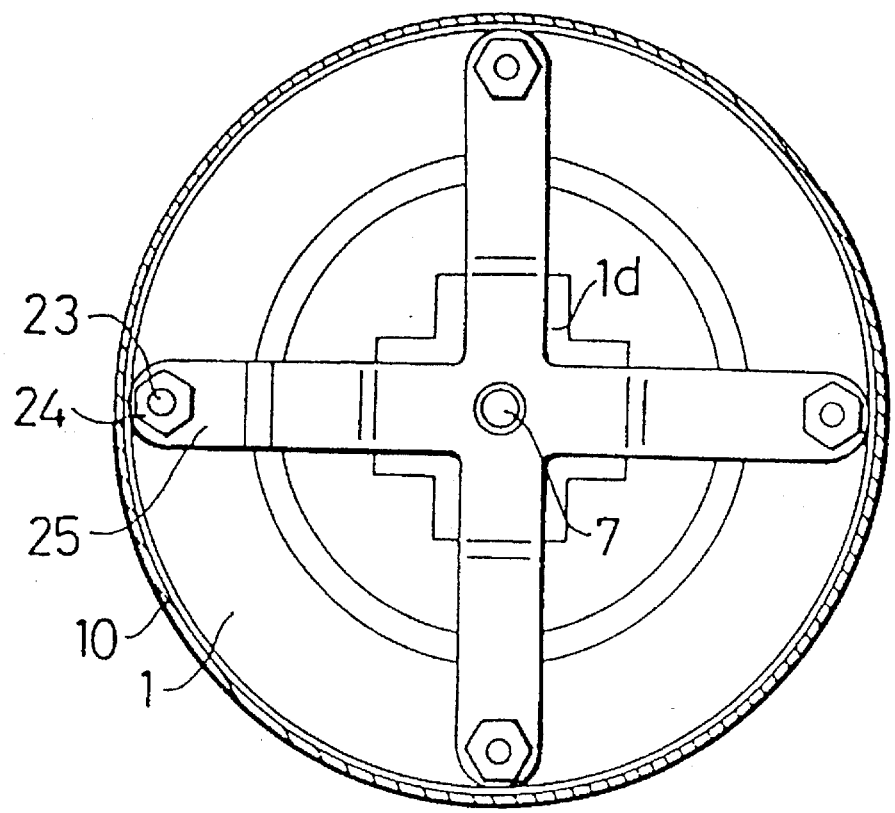

FIGS. 8(a) and 8(b) illustrate another embodiment of fixing the fixed scroll 1 made of said ceramics. The fixed scroll 1 is fixed to the frame 2 through a supporting member 25 made from a cross-shaped spring plate. At the side of the fixed scroll opposite to the wrap side, a cross-shaped guide groove is formed by four L-shaped projections 1d. The supporting member 25 is fitted in the guide groove and the outer end of the respective legs of the supporting member 25 are fixed by nuts 24 or the like to tightening members 23 fixed to the frame 3, allowing small axial and radial movements of the peripheral portion of fixed scroll 1 due to the resiliency of spring plate supporting member 25. Angular position of the fixed scroll 1 relative to the frame 3 and the position thereof from the axis are defined by the fitting between the guide groove 1d and the supporting member 25. With reference to the axial direction, the fixed scroll 1 is pressed against the frame 3 under the spring action of the supporting member 25. In the embodiment shown in FIGS. 8(a) and 8(b), at the side of the fixed scroll 1 opposite to the wrap side, the discharge chamber 10a is formed to which the discharge pressure is constantly applied, so that the fixed scroll 1 is constantly pressed during operation to the frame 3 under the action of the pressure difference relative to the compression chamber 8.

Figure 9A:
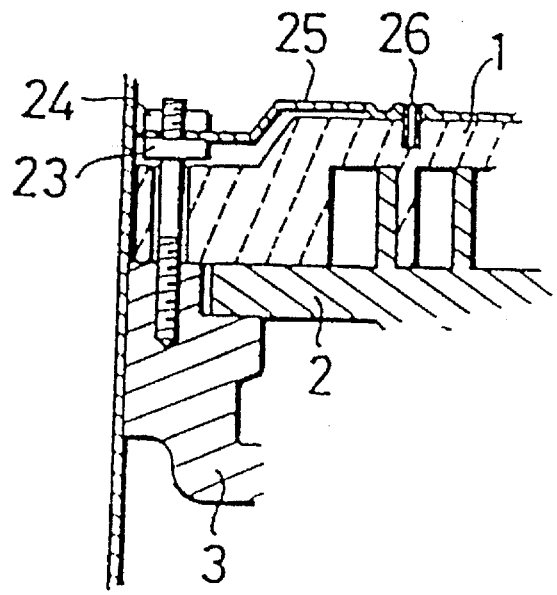
FIG. 9a is a sectional view showing a fixing part of a fixed scroll in a further embodiment of the present invention.
Figure 9B:
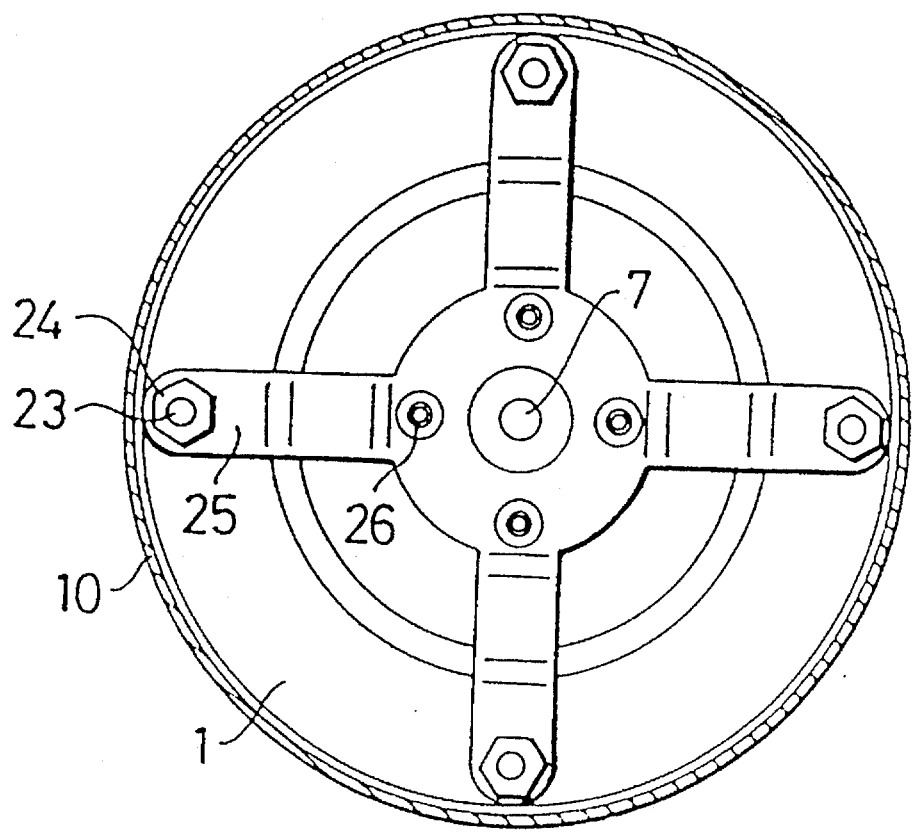

FIGS. 9(a) and 9(b) illustrate an embodiment in which the supporting member 25 is fixed at its central portion to the fixed scroll 1 by a plurality of split pins 26. The stress caused by the difference in thermal expansion between the ceramics and the metal is absorbed by the elasticity of the split pins, whereby the ceramics is prevented from producing cracking or the like.

Figure 10A:
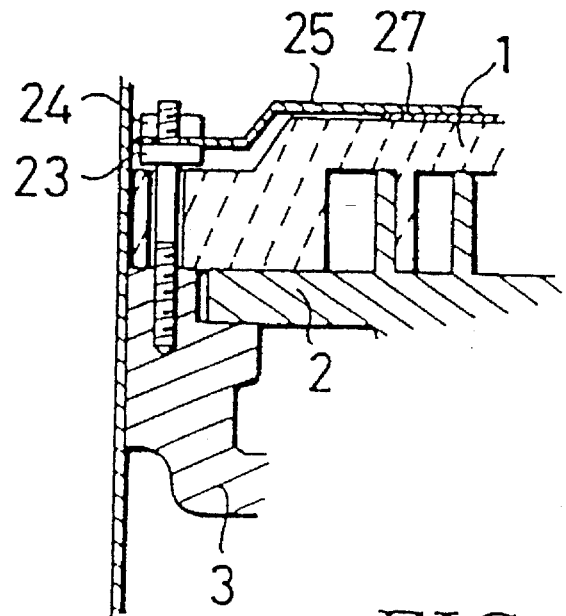
FIG. 10a is a sectional view showing a fixing part of a fixed scroll in another embodiment of the present invention.
Figure 10B:
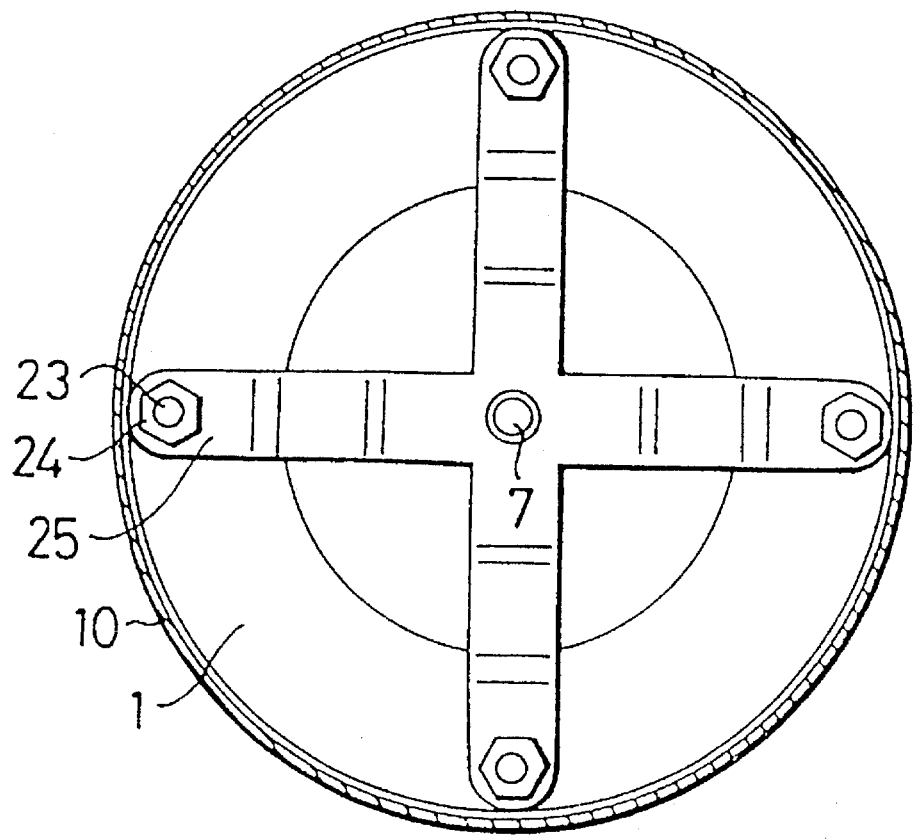

FIGS. 10(a) and 10(b) illustrate an embodiment in which the supporting member 25 is connected directly or indirectly through an insert material 27 (for example, Ti-system, Al-system or other metallic material) to the side of the fixed scroll 1 opposite to the wrap side, and the supporting member 25 is fixed at the outer ends of the respective legs to the frame by the bolts 23.

In the constructions as shown in FIGS. 8–10, the fixed scroll 1 is fixed to the frame 3, while the stress caused by the difference in thermal expansion between the ceramics and the metallic member is relieved by the action of the supporting member 25, and, therefore, the scroll member made of the ceramics can be used without causing any difficulty. Furthermore, in the construction in which the fixing structure as shown in FIGS. 8–10, is adopted, in the case where an abnormally high pressure is produced in the compression chamber (for example, in the case where a liquid refrigerant is suctioned through the inlet port), the fixed scroll 1 is pushed in an upward direction toward the side opposite to the wrap side against the spring force of the supporting member 25, whereby the gap between the wraps in axial direction is increased, and whereby the gas escapes to the lower pressure side and excessive increase of pressure is avoided. In the case where a foreign material is mixed in the gas, the fixed scroll produces a minute movement in the direction toward the side opposite to the wrap, thereby avoiding the damage of the scroll compressor. Thus, the reliability of the scroll compressor is further improved.

Figure 11:
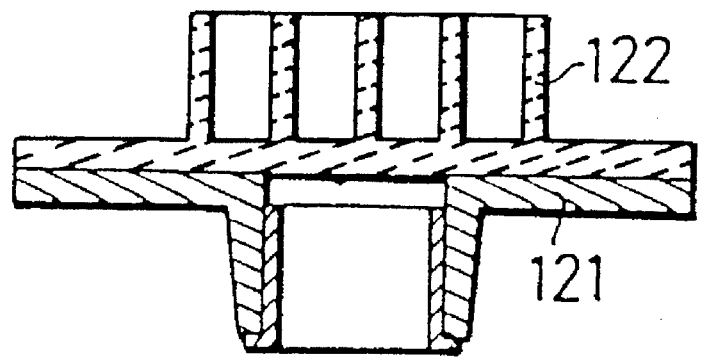
FIG. 11 is a sectional view showing an orbiting scroll according to another embodiment of the present invention.
Figure 12:
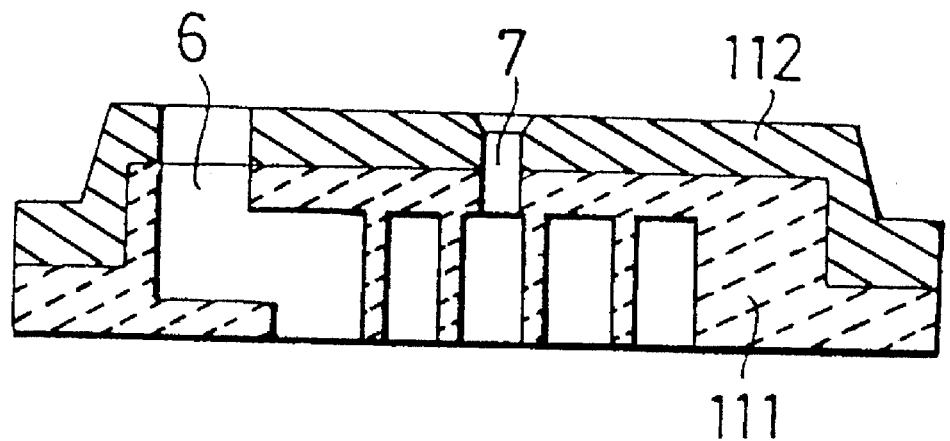
FIG. 12 is a sectional view showing a fixed scroll according to a further embodiment of the present invention.

FIG. 11 illustrates an orbiting scroll 2 which is partly made of the above-mentioned ceramics. A part 122 including the spiral wrap is made of the above-mentioned ceramics and the remaining part 121 is made of metallic material. These parts are connected together to form an integral member. FIG. 12 illustrates an example of a fixed scroll 1 which is partly made of the above mentioned ceramics. The fixed scroll includes a part 111 made of the above-mentioned ceramics and a part 112 made of metallic material. In the embodiments shown in FIGS. 11 and 12, the metallic part serves to increase the mechanical strength of the scroll made of the ceramics. The wrap and the end plate which form the compression chamber are made of the above-mentioned ceramics, thus enabling such technical advantages as suppression of thermal influence, proper control of gaps between the scrolls, maintaining high efficiency, high reliability and reduction of number of machining steps.

In the above explanation, the description has been given to the revolving type scroll compressor. However, the present invention is not limited to this type of fluid machine. The present invention can be embodied in a revolving type scroll expander. Also, the present invention can be embodied in a two-scroll revolving type scroll fluid machine in which a pair of scrolls engaged together in eccentric manner are rotated in a same direction and at a same speed, while maintaining a constant phase difference therebetween, so that one of the scrolls makes a movement as if it makes an orbital movement relatively to the other scroll without producing rotation around its axis. In these cases, the technical advantages as described above can be attained. The present invention can be also applied to a transferring type scroll machine having fewer turning number of wrap (which is used as a liquid pump or the like).

According to the present invention as described above, the scroll member is made wholly or partly of the ceramics which is superior in near-net-shape property, a scroll fluid machine in which an influence of a thermal environment surrounding the scroll fluid machine can be suppressed and which has a high volumetric efficiency, a reduced power loss, a high performance and a high reliability can be realized with reduced number of processing steps. It is possible to impregnate the open pores formed therein with lubricant oil, thereby further increasing the reliability. When the Oldham ring and the bearing portions are made of the same ceramics, the dimensional precision can be further increased and the number of required processing steps can be considerably reduced. The anti-sticking property and the wear-resistant property are improved and the weight of the Oldham ring is reduced and hence the inertia is reduced.

What is claimed is:

1. A scroll fluid machine comprising a fixed scroll having a first end plate, a first spiral wrap upstanding from said first end plate, a frame supporting an outside periphery of said fixed scroll, an orbiting scroll having a second end plate and a second spiral wrap upstanding from said second end plate, said fixed scroll and said orbiting scroll being arranged so that the first and second spiral wraps are directed inwardly and are engageable with each other, a driving shaft rotatably supported by bearings and having an eccentric portion at its end which engages with the second end plate, and an Oldham ring interposed between the orbiting scroll and a stationary member to prevent the orbiting scroll from rotating around its own axis, wherein the fixed scroll is made of precise sintered ceramics and is connected to said frame through a supporting member interposed therebetween for defining an angular position of the fixed scroll relative to the frame at a position from a central axis thereof and for elastically pressing the fixed scroll to the frame in an axial direction while allowing small axial and radial movements of the peripheral portion of the fixed scroll.

2. A scroll fluid machine according to claim 1, wherein said supporting member is connected through an insert member to a side of the end plate of said fixed scroll opposite to the wrap side.

3. A scroll fluid machine comprising a pair of scrolls, each of said scrolls having an end plate and a spiral wrap upstanding from said end plate, said scrolls being arranged so that the spiral wraps are directed inwardly and are engageable with each other in an eccentric relationship, and one of said pair of scrolls is driven to produce orbital movement without producing a rotational movement around its own axis, wherein at least one of a portion of one of said scrolls, one of the wraps, and a portion connected to one of the wraps is formed of porous precise sintered ceramic material having a porosity of 10–30% with the pores thereof impregnated with lubricant, and wherein said porous precise sintered ceramic material is made by reaction-bonding inorganic compound particles of at lest one of $Al_2O_3$, SiC, TiN or Zrn with $Si_3N_4$; and wherein said last-named one of said scrolls is made of precise sintered ceramics;

said machine further comprising a frame, a supporting member interposed between said last-named one of said scrolls and said frame to connect said last-named one of said scrolls to said frame, for defining an angular position of said last-named one of said scrolls relative to said frame and for elastically pressing said last-named one of said scrolls to the frame in an axial direction while allowing small axial and radial movements of the peripheral portion of said one of last-named said scrolls.

4. A scroll fluid machine according to claim 3, wherein said supporting member is connected directly or indirectly through an insert member to a side of the end plate of said last-named one of said scrolls opposite the wrap side.

5. A scroll fluid machine comprising a fixed scroll having an end plate and a spiral wrap upstanding from said end plate, a frame supporting an outside periphery of said fixed scroll, an orbiting scroll having an end plate and a spiral wrap upstanding from said end plate, said fixed scroll and said orbiting scroll being arranged so that their spiral wraps are directed inwardly and are engageable with each other, a driving shaft rotatably supported by bearings and having an eccentric portion at its end engageable with the end plate of the orbiting scroll, and an Oldham ring interposed between the orbiting scroll and a stationary member to prevent the orbiting scroll from rotating around its own axis, wherein the bearings at least one of rotatably support said driving shaft or engage with said driving shaft and are at least partially formed of precise sintered ceramics, and wherein said fixed scroll is made of precise sintered ceramics and said fixed scroll is connected to said frame through a supporting member interposed therebetween for defining an angular position of the fixed scroll relative to the frame at a position from a central axis thereof and for elastically pressing the fixed scroll to the frame in an axial direction, and wherein said supporting member is fitted in an engaging groove formed on the end plate of the fixed scroll at the side opposite to the side of the wrap.

6. A scroll fluid machine comprising a fixed scroll having an end plate and a spiral wrap upstanding from said end plate, a frame supporting an outside periphery of said fixed scroll, an orbiting scroll having an end plate and a spiral wrap upstanding from said end plate, said fixed scroll and said orbiting scroll being arranged so that their spiral wraps are directed inwardly and are engageable with each other, a driving shaft rotatably supported by bearings and having an eccentric portion at its end engageable with the end plate of the orbiting scroll, and an Oldham ring interposed between the orbiting scroll and a stationary member to prevent the orbiting scroll from rotating around its own axis, wherein said Oldham ring is made of precise sintered ceramics, and wherein said fixed scroll is made of precise sintered ceramics and said fixed scroll is connected to said frame through a supporting member interposed therebetween for defining an angular position of the fixed scroll relative to the frame at a position from a central axis thereof for elastically pressing the fixed scroll to the frame in an axial direction, and wherein said supporting member is fitted in an engaging groove formed on the end plate of the fixed scroll at a side opposite to the side of the wrap.

7. A scroll fluid machine comprising a fixed scroll having an end plate and a spiral wrap upstanding from said end plate, a frame supporting an outside periphery of said fixed scroll, an orbiting scroll having an end plate and a spiral wrap upstanding from said end plate, said fixed scroll and said orbiting scroll being arranged so that their spiral wraps are directed inwardly and are engageable with each other, a driving shaft rotatably supported by bearings and having an eccentric portion at its end engageable with the end plate of the orbiting scroll, and an Oldham ring interposed between the orbiting scroll and a stationary member to prevent the orbiting scroll from rotating around its axis, wherein the bearings at least one of rotatably support said driving shaft or engage with said driving shaft and are at least partially formed of precise sintered ceramics, and wherein said fixed scroll is made of precise sintered ceramics and said fixed scroll is connected to said frame through a supporting member interposed therebetween for defining an angular position of the fixed scroll relative to the frame at a position from a central axis thereof for elastically pressing the fixed scroll to the frame in an axial direction, and wherein said supporting member is connected to a side of the end plate of the fixed scroll opposite to the wrap side through elastically deformable pins.

8. A scroll fluid machine comprising a fixed scroll having an end plate and a spiral wrap upstanding from said end plate, a frame supporting an outside periphery of said fixed scroll, an orbiting scroll having an end plate and a spiral wrap upstanding from said end plate, said fixed scroll and said orbiting scroll being arranged so that their spiral wraps are directed inwardly and are engageable with each other, a driving shaft rotatably supported by bearings and having an eccentric portion at its end engageable with the end plate of the orbiting scroll, and an Oldham ring interposed between the orbiting scroll and a stationary member to prevent the orbiting scroll from rotating around its own axis, wherein said Oldham ring is made of precise sintered ceramics, and wherein said fixed scroll is made of precise sintered ceramics and said fixed scroll is connected to said frame through a supporting member interposed therebetween for defining an angular position of the fixed scroll relative to the frame at a position from a central axis thereof and for elastically pressing the fixed scroll to the frame in an axial direction, and wherein said supporting member is connected to a side of the end plate of the fixed scroll opposite to the wrap side through elastically deformanble pins.

9. A scroll fluid machine, comprising a pair of scrolls, a frame, and an insert member, each of said scrolls having an end plate and a spiral wrap upstanding from said end plate, said scrolls being arranged so that the spiral wraps are directed inwardly and are engageable with each other in an eccentric relationship, and one of said pair of scrolls is driven to produce orbital movement without producing a rotational movement around its own axis, wherein at least one of a portion of one of said scrolls, one of the wraps, and a portion connected to one of the wraps is formed of porous precise sintered ceramic material having a porosity of 10–30% with the pores thereof impregnated with lubricant, and wherein said porous precise sintered ceramic material is made by reaction-bonding inorganic compound particles of at least one of $Al_2O_3$, SiC, TiN or Zrn with $Si_3N_4$; and wherein at least a portion of one of said scrolls is formed of precise sintered ceramics, and wherein a peripheral portion of said last-named one of said scrolls is connected to said frame through said insert member, while allowing small axial and radial movements of the peripheral portion of said last-named one of said scrolls, to relieve stress generated therebetween.

10. A scroll fluid machine, comprising a pair of scrolls each of which has an end plate and a spiral wrap upstanding from said end plate, said scrolls being arranged so that the spiral wraps are directed inwardly and are engageable with each other in an eccentric relationship, and one of said pair of scrolls is driven to produce orbital movement without producing a rotational movement around its own axis, wherein at least one of a portion of one of said scrolls, one of the wraps, and a portion connected to one of the wraps is formed of porous precise sintered ceramic material having a porosity of 10–30% with the pores thereof impregnated with lubricant, and wherein said porous precise sintered ceramic material is made by reaction-bonding inorganic compound particles of at least one of $Al_2O_3$, SiC, TiN and Zrn with $Si_3N_4$;

wherein one of said scrolls is made of precise sintered ceramics and said machine further comprises a frame, a supporting member interposed between said last-named one of said scrolls and said frame to connect said last-named one of said scrolls to said frame, for defining an angular position of said last-named one of said scrolls relative to the frame and for elastically pressing said last-named one of said scrolls to the frame in an axial direction while allowing small axial and radial movements of the peripheral portion of said last-named one of said scrolls; and wherein said supporting member is fitted in an engaging groove formed on the end plate of said last-named one of said scrolls at a side opposite to a side of the wrap.

11. A scroll fluid machine, comprising a pair of scrolls each of which has an end plate and a spiral wrap upstanding from said end plate, said scrolls being arranged so that the spiral wraps are directed inwardly and are engageable with each other in an eccentric relationship, and one of said pair of scrolls is driven to produce orbital movement without producing a rotational movement around its own axis, wherein at least one of a portion of one of said scrolls, one of the wraps, and a portion connected to one of the wraps is formed of porous precise sintered ceramic material having a porosity of 10–30% with the pores thereof impregnated with lubricant, and wherein said porous precise sintered ceramic material is made by reaction-bonding inorganic compound particles of at least one of $Al_2O_3$, SiC, TiN and Zrn with $Si_3N_4$;

wherein one of said scrolls is made of precise sintered ceramics and said machine further comprises a frame, a supporting member interposed between said last-named one of said scrolls and said frame to connect said last-named one of said scrolls to said frame, for defining an angular position of said last-named one of said scrolls relative to the frame and for elastically pressing said last-named one of said scrolls to the frame in an axial direction while allowing small axial and radial movements of the peripheral portion of said last-named one of said scrolls; and wherein said supporting member is connected to a side of the end plate of said last-named one of said scrolls opposite to the wrap side through elastically deformable pins.

12. A scroll fluid machine comprising a fixed scroll having a first end plate, a first spiral wrap upstanding from said first end plate, a frame supporting an outside periphery of said fixed scroll, an orbiting scroll having a second end plate and a second spiral wrap upstanding from said second end plate, said fixed scroll and said orbiting scroll being arranged so that the first and second spiral wraps are directed inwardly and are engageable with each other, a driving shaft rotatably supported by bearings and having an eccentric portion at its end which engages with the second end plate, and an Oldham ring interposed between the orbiting scroll and a stationary member to prevent the orbiting scroll from rotating around its own axis, wherein the fixed scroll is made of precise sintered ceramics and is connected to said frame through a supporting member interposed therebetween for defining an angular position of the fixed scroll relative to the frame and for elastically pressing the fixed scroll to the frame in an axial direction while allowing small axial and radial movements of the peripheral portion of the fixed scroll; and wherein said supporting member is fitted in an engaging groove formed on the end plate of said fixed scroll at a side opposite to a side of the wrap.

13. A scroll fluid machine, comprising a fixed scroll having a first end plate, a first spiral wrap upstanding from said first end plate, a frame supporting an outside periphery of said fixed scroll, an orbiting scroll having a second end plate and a second spiral wrap upstanding from said second end plate, said fixed scroll and said orbiting scroll being arranged so that the first and second spiral wraps are directed inwardly and are engageable with each other, a driving shaft rotatably supported by bearings and having an eccentric portion at its end which engages with the second end plate, and an Oldham ring interposed between the orbiting scroll and a stationary member to prevent the orbiting scroll from rotating around its own axis, wherein the fixed scroll is made of precise sintered ceramics and is connected to said frame through a supporting member interposed therebetween for defining an angular position of the fixed scroll relative to the frame and for elastically pressing the fixed scroll to the frame in an axial direction while allowing small axial and radial movements of the peripheral portion of the fixed scroll; and wherein said supporting member is connected to a side of the end plate of said fixed scroll opposite to the wrap side through elastically deformable pins.

* * * * *